United States Patent
Kyodo

[11] Patent Number: 5,811,969
[45] Date of Patent: Sep. 22, 1998

[54] SHAFT POSITION DETECTION SENSOR MONITORING CHANGES IN COIL INDUCTANCE

[75] Inventor: Yasumasa Kyodo, Tokyo, Japan

[73] Assignee: Sony Corporation, Japan

[21] Appl. No.: 771,686

[22] Filed: Dec. 23, 1996

Related U.S. Application Data

[63] Continuation of Ser. No. 458,726, Jun. 2, 1995, Pat. No. 5,652,510.

[30] Foreign Application Priority Data

Jun. 3, 1994 [JP] Japan ................................ 6-144070

[51] Int. Cl.⁶ ............................. G01B 7/14; G01D 5/20; G01R 27/26
[52] U.S. Cl. ............................. 324/207.16; 324/207.22; 324/207.24
[58] Field of Search .................. 324/163, 164, 324/173, 174, 207.15, 207.16, 207.22, 207.24, 207.25, 207.26, 234, 236–239; 92/5; 331/64, 65; 340/870.31, 870.33

[56] References Cited

U.S. PATENT DOCUMENTS

| | | | |
|---|---|---|---|
| 3,103,976 | 9/1963 | De Vries et al. | 324/207.26 X |
| 3,243,692 | 3/1966 | Heissmeier et al. | 324/174 X |
| 3,513,408 | 5/1970 | McGee | 324/207.16 X |
| 3,737,764 | 6/1973 | Dufayet | 327/237 |
| 3,745,451 | 7/1973 | Goyette | 324/237 X |
| 3,851,242 | 11/1974 | Ellis | 324/236 |
| 3,891,918 | 6/1975 | Ellis | 324/236 X |
| 4,127,814 | 11/1978 | Rasigade et al. | 324/207.22 |
| 4,717,874 | 1/1988 | Ichikawa et al. | 324/207.24 X |
| 5,144,231 | 9/1992 | Tenenbaum et al. | 324/207.25 X |
| 5,172,298 | 12/1992 | Shimizu et al. | 324/207.16 X |
| 5,189,366 | 2/1993 | Mayo | 324/239 X |
| 5,450,930 | 9/1995 | Martens et al. | 324/207.24 X |

FOREIGN PATENT DOCUMENTS

| | | | |
|---|---|---|---|
| 0121007 | 10/1984 | European Pat. Off. | 324/207.16 |
| 3347052 | 7/1985 | Germany | 324/207.16 |
| 08945 | 5/1992 | WIPO | 324/207.16 |

*Primary Examiner*—Gerard R. Strecker
*Attorney, Agent, or Firm*—Ronald P. Kananen

[57] ABSTRACT

A shaft position detection device for detecting a certain position on a shaft comprising: a movable shaft including a detection portion to be detected, a characteristic of which is different from the other portions; a position detection coil to which the movable shaft is freely inserted; an inductance detecting means for detecting changing of inductance between a case of the movable shaft being in the position detection coil and a case of the movable shaft being out of the position detection coil; in which a position of the detection portion in response to the changing of the inductance. The difference of the magnetic characteristic is defined by a cross section area of the shaft, winding a magnetic tape, forming a magnetic layer.

11 Claims, 8 Drawing Sheets

SHAFT POSITION DETECTION SENSOR MONITORING CHANGES IN COIL INDUCTANCE

This application is a continuation of application Ser. No. 08/458,726 filed Jun. 2, 1995, now U.S. Pat. No. 5,652,510.

BACKGROUND OF THE INVENTION

The present invention relates to a shaft position detection sensor which decreases erroneous detections due to disperse of grease coated on a shaft. The shaft position detection sensor magnetically detects a position on the shaft which is constructed in a manner that a permeability or a cross section area of a detection portion to be detected is different from the other portions.

In the case that a position on a ball screw is detected in a movement mechanism using a ball screw and a ball nut, a position detection sensor as described later has been known. An optical sensor is provided on the ball nut while a portion where a reflectance rate being different from other portions is provided on at a certain portion of the ball screw, so that the strength of the reflection light is detected.

However, in such position sensor optically detecting the position, it is necessary to place the detecting unit extremely close to the ball screw. Therefore, the optical detection unit may be dirty due to disperse of grease coated on a surface of the ball screw. Further, other effects can not be ignored. For example, as described above, detection accuracy may be deteriorated.

SUMMARY OF THE INVENTION

In order to solve the above mentioned problems, the present invention provides a shaft position sensor which magnetically detects a position on a shaft which is constructed in a manner that a permeability of a detection portion to be detected is different from the other portions or a shaft which is made of a magnetic material and is structured in a manner that a cross section area of a detection portion to be detected is different from that of the other portions. The shaft position sensor includes a detection coil into which the shaft is inserted, and a detection unit which detects a difference between an inductance detected when a detection portion to be detected being in the detection coil and an inductance when a detection portion is out of detection coil.

According to the invention, the shaft is constructed in a manner that a permeability or a cross section area of a detection portion to be detected is different from that of the other portions, so that the position on the shaft is detected by detecting differences between inductances. Therefore, detection is not influenced due to disperse of the grease coated on the shaft. Accordingly, the detection accuracy can be improved.

BRIEF DESCRIPTION OF THE DRAWINGS

FIG. 6, comprised of FIGS. 6A and 6B, is an explanation diagram for a surface effect at edge portion of the shaft;

DETAILED DESCRIPTION OF THE PREFERRED EMBODIMENTS

A shaft position detection sensor of the present invention will be described with reference to the drawings.

Figure 1:
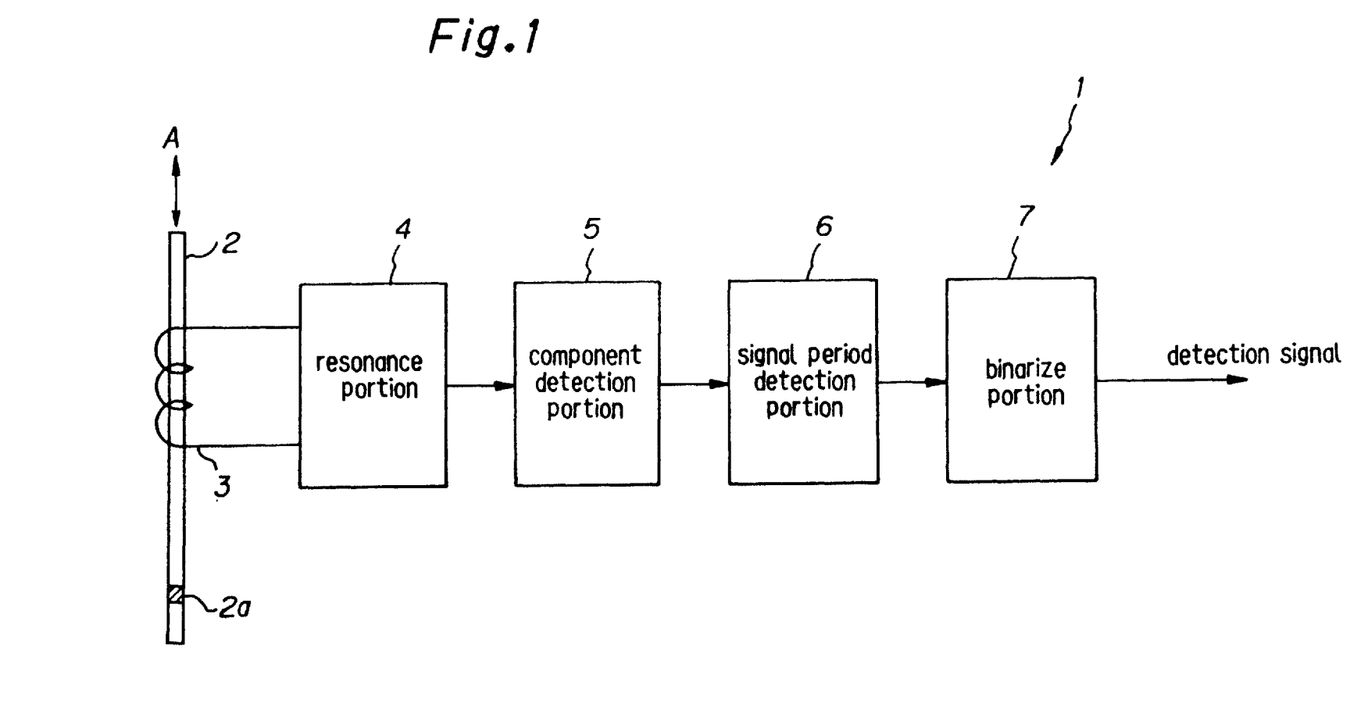
FIG. 1 is a block diagram showing a basic structure of a shaft position detection sensor of the present invention.
Figure 2A:
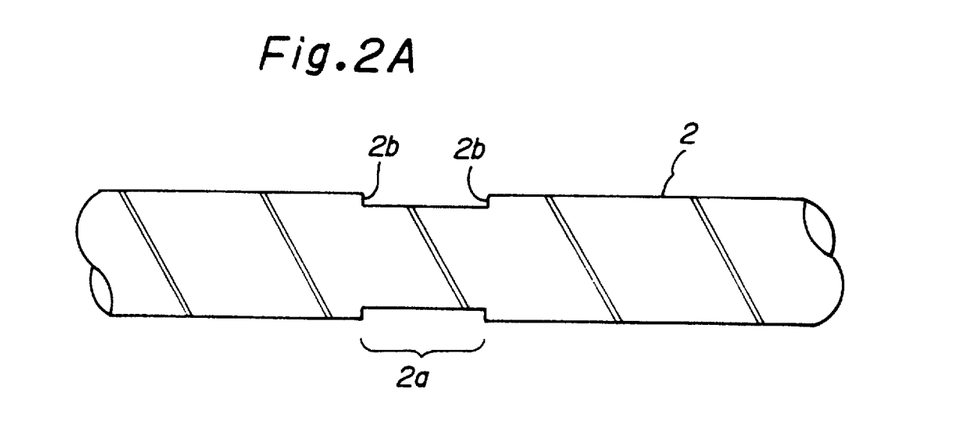
FIGS. 2A to 2C show a detection portion formed on a shaft, FIG. 2A showing a case wherein a cross section area is reduced at a detection portion, FIG. 2B showing a case wherein a magnetic tape is wound on the shaft, and FIG. 2C showing a case wherein a magnetic layer is formed on the shaft.
Figure 2B:
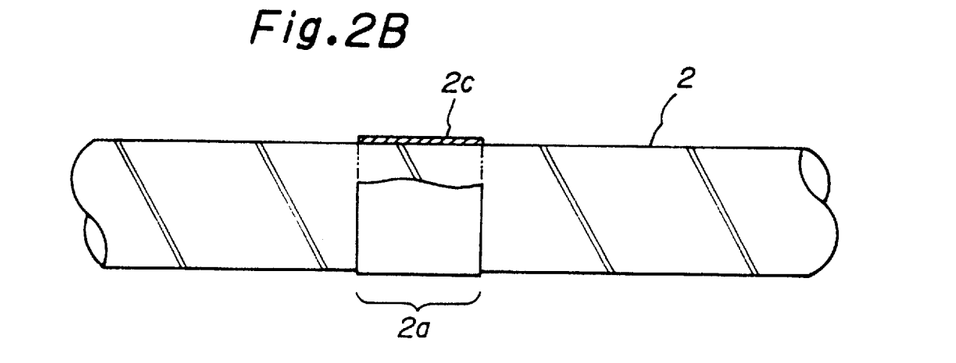
Figure 2C:
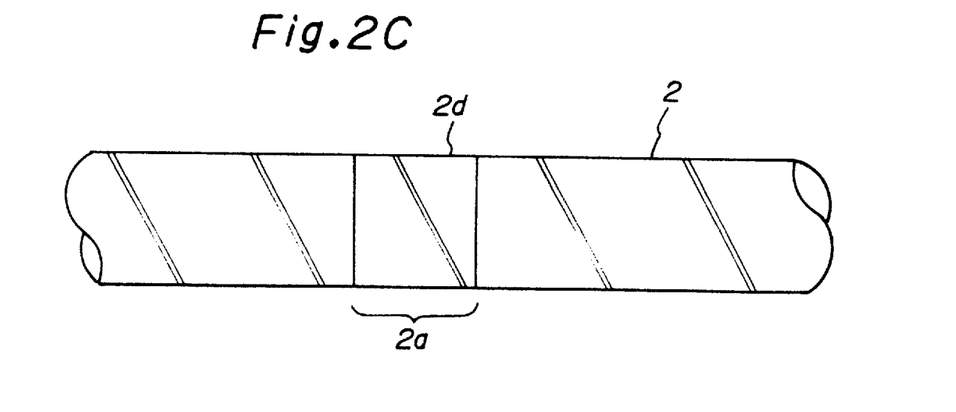

With reference to FIGS. 1 and 2, detection principle of the shaft detection sensor of the invention is explained.

FIG. 1 shows a basic structure of the shaft position sensor 1. A shaft has a detection portion 2a to be detected the magnetic characteristic of which is different from the other portions. For example, the following arrangements are selectable. First, as shown in FIG. 2A, a cross section area of the detection portion 2a is smaller than that of the other portions so that step portions 2a and 2b are formed. Second, as shown in FIG. 2B, a magnetic tape 2c is wound at the detection portion 2a. Third, as shown in FIG. 2C, a magnetic layer 2d is formed at the detection portion 2a by deposition or sputtering so that the magnetic characteristic of the detection portion 2a is made different from the other portion. The detection portion 2a is not limited to one portion. The detection portion 2a may be provided at plural portions along the shaft 2.

Reference numeral 3 denotes a detection coil. The shaft 2 is inserted into the detection coil 3. The shaft 2 is straightly moved relative to the detection coil 3 indicated by arrow A as shown in FIG. 1. An inductance difference between when a detection portion 2a is in the detection coil 3 and when the detection portion 2a is out of detection coil 3 is detected as primary information. In FIG. 1, the detection coil 3 is fixed, and the shaft is movable. Needless to say, the relationship between the detection coil 3 and the shaft 2 may be the opposite, that is, the detection coil 3 is movable and the shaft 2 is fixed.

Reference numeral 4 is a resonance portion which uses the detection coil 3 as an inductance element. The alternating output of the resonance portion 4 is applied to an alternating output detection portion 5 at subsequent stage. The alternating output detection portion 5 detects the alternating output from the signal applied from the resonance portion 4. An output signal of the alternating output detection portion 5 is applied to a signal period detection portion 6 at subsequent stage. The difference between the inductance of the detection portion 2a and that of the other portions is detected as a difference of the detected period by the signal period detection portion.

An output of the signal period detection portion 6 is applied to a binarize portion 7 at subsequent stage in order to convert into binarize signal which represent whether the detection portion 2a of the shaft 2 is detected.

As described above, according to the invention, because the shaft position is magnetically detected, the decline of the detection accuracy due to disperse of the grease coated on the shaft 2 is prevented in comparison with the optical detection.

FIGS. 3 to 8 show an embodiment of the present invention. The embodiment relates to the position detection of the ball screw to detect a stroke end or a home position. A cross section area of the ball screw is varied as shown in FIG. 2A.

Figure 3:
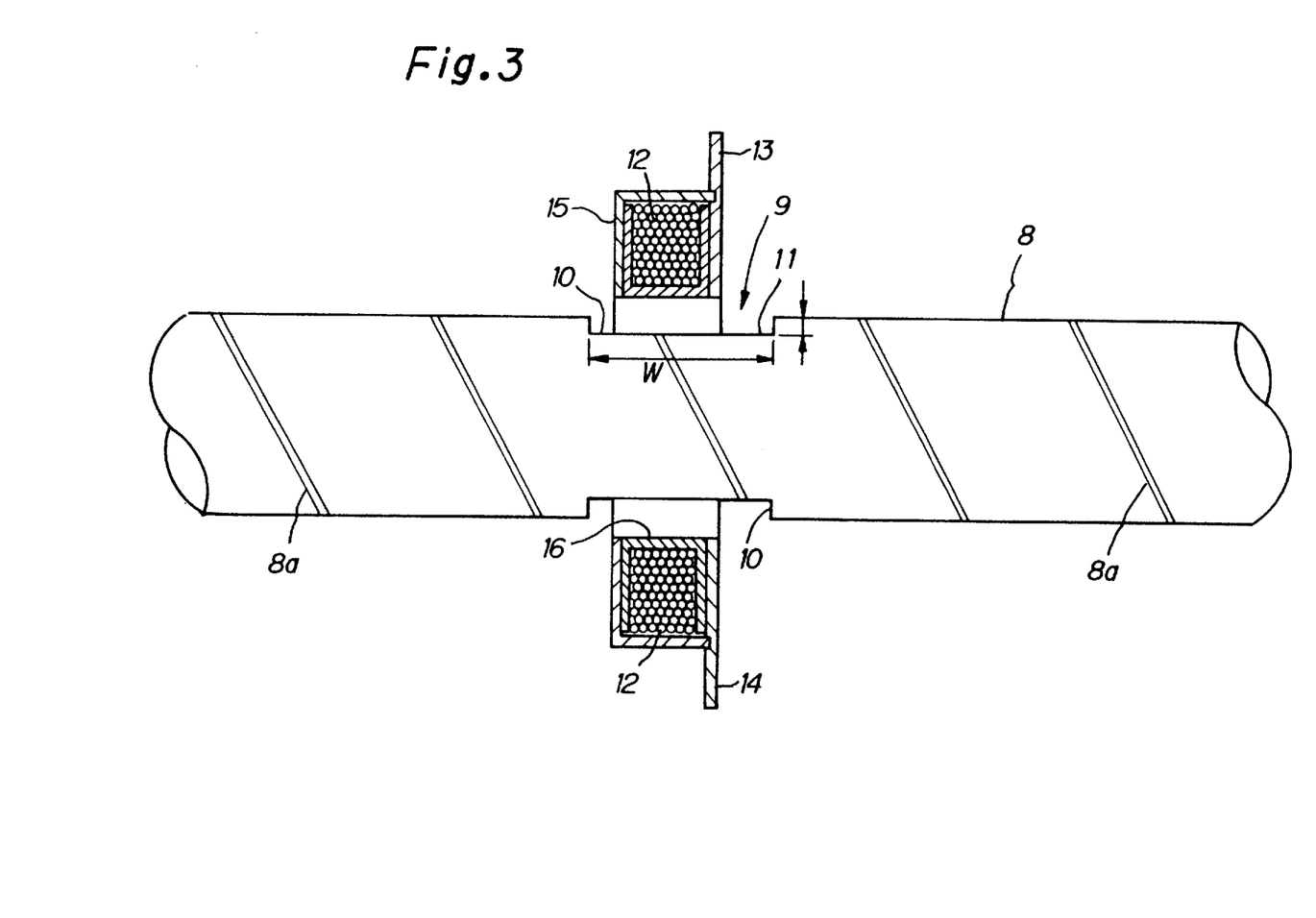
FIG. 3 shows a cross section of a coil and a detection portion wherein the shaft position detection sensor of the invention is applied to detect a position on ball screw.

FIG. 3 shows a partial view of the ball screw and a coil portion.

In the drawing, reference numeral 8 is a ball screw, outer surface of which a spiral lead groove of about 1 mm depth is formed. A detection portion 9 to be detected is formed on the ball screw 8. A cross section area is smaller than that of the other portions so that step portions 10 are formed. Namely, a shallow groove 11 is formed on the ball screw 8 in the depth of about 0.15 mm. This shallow groove 11 is designed not to affect the engagement of the ball screw 8 and ball nut. The width W of the shallow groove is made greater than the thickness of the coil housing.

Figure 4:
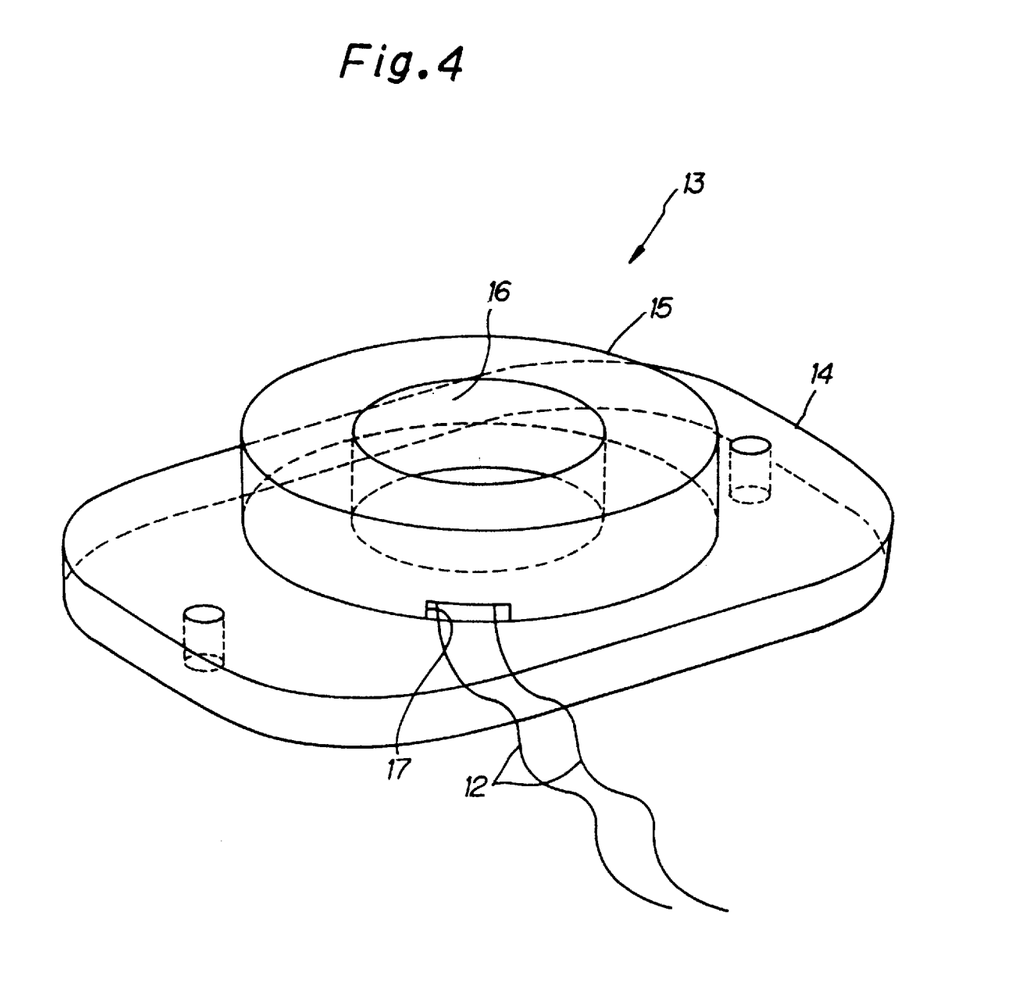
FIG. 4 is a perspective view of the coil housing of FIG. 3.

A coil 12 is accommodated in a coil housing 13. As shown in FIG. 4, the coil housing 13 is composed of a mounting plate 14 made of Ni—Fe system material and a cylindrical coil accommodating part 15 which is provided on the mounting plate 14. A insertion aperture 16 is formed at a center of the coil accommodating part 15 which allows penetration of the ball screw 8 thereinto. The coil housing 13 is fixed to the ball nut or a fixing bracket in a manner that the mounting plate 14 is attached by screws or the like.

Figure 5:
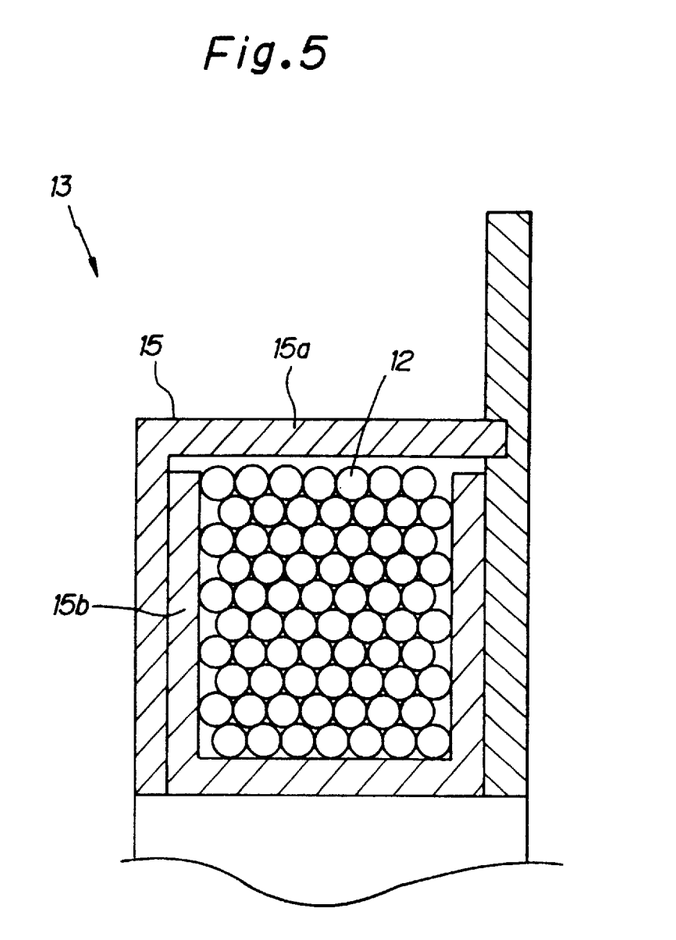
FIG. 5 is an enlarged cross section of a primary portion showing a storage condition of coil.

The coil accommodating portion 15 is composed of an outer case 15a having L-shaped cross section and an inner bobbin 15b having U-shaped cross section as shown in FIG. 5.

The outer case 15a is made of Ni-Fe system material such as permalloy in order to reduce influence of external magnetic flux or temperature and to concentrate the sensing magnetic flux.

The inner bobbin 15b made of synthetic resin is provided to protect the coil 12 from the disperse of grease from the ball screw 8.

The coil 12 is wound around the inner bobbin 15b and is disposed in a space defined between the outer case 15a and the inner bobbin 15b. The coil 12 is wound about 50 to 100 times, and the diameter of coil is about 0.05 to 0.1 mm. The ends of the coil 12 are lead out from a hole 17 (see FIG. 4) which is formed on an outer circumferential surface of the coil accommodating part 15 at a position close to the mounting plate 14.

In this embodiment of the invention, either of the following can be employed as a detection principle.

(a) In case of energization frequency for coil 12 being low, the inductance is varied in proportion to the cross section area of the ball screw 8. Namely, the difference between the cross section area of the detection portion 9 and that of the other portions is detected as change of the inductance.

(b) In case of energization frequency being high, it is well known as a surface effect that if an edge is formed on the surface of the shaft, then the magnetic flux is concentrated to the edge. Therefore, in case of energization frequency for coil 12 being high, the magnetic flux is concentrated to the edge of the step portion 10 so that the inductance will be varied due to this edge.

Figure 6A:
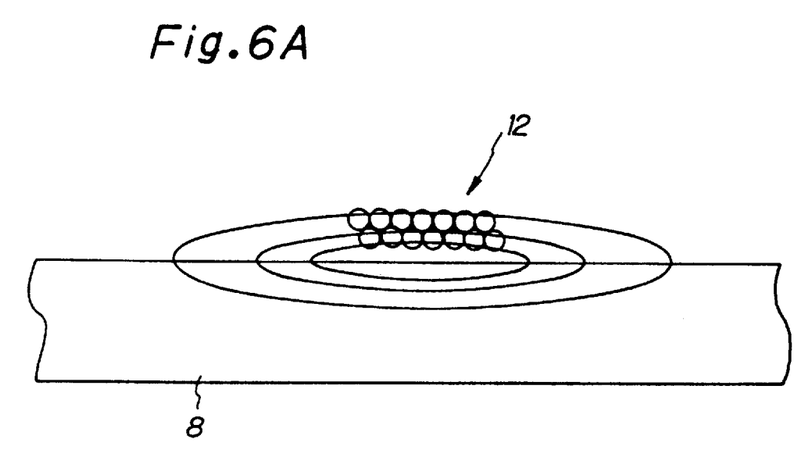
Figure 6B:
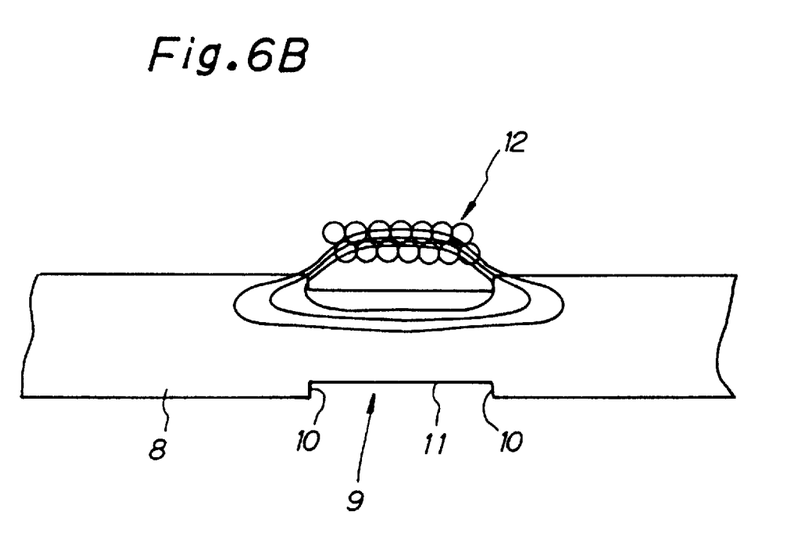

In the case where the energization frequency for coil 12 is in a range from 500K to 1 M Hz, the magnetic flux tend to pass the surface of the shaft as shown in FIG. 6A. If an edge exists on the shaft, the magnetic flux is concentrated on the edge as shown in FIG. 6B. Therefore, when the detection portion 9 passes the coil 12, the inductance will raise about several percentage.

Other factors which aid in determining which of the above mentioned two detection principles should be utilized include the depth of the groove 11, S/N ratio of the signal, and stability of a sensitivity. The above principles are preferred because the spiral lead groove 8a is formed on the ball screw 8 and the cross section area of the ball screw 8 is constant irrespective of the rotational angle. Therefore, it is advantageous to decrease the detection error of the inductance.

Figure 7:
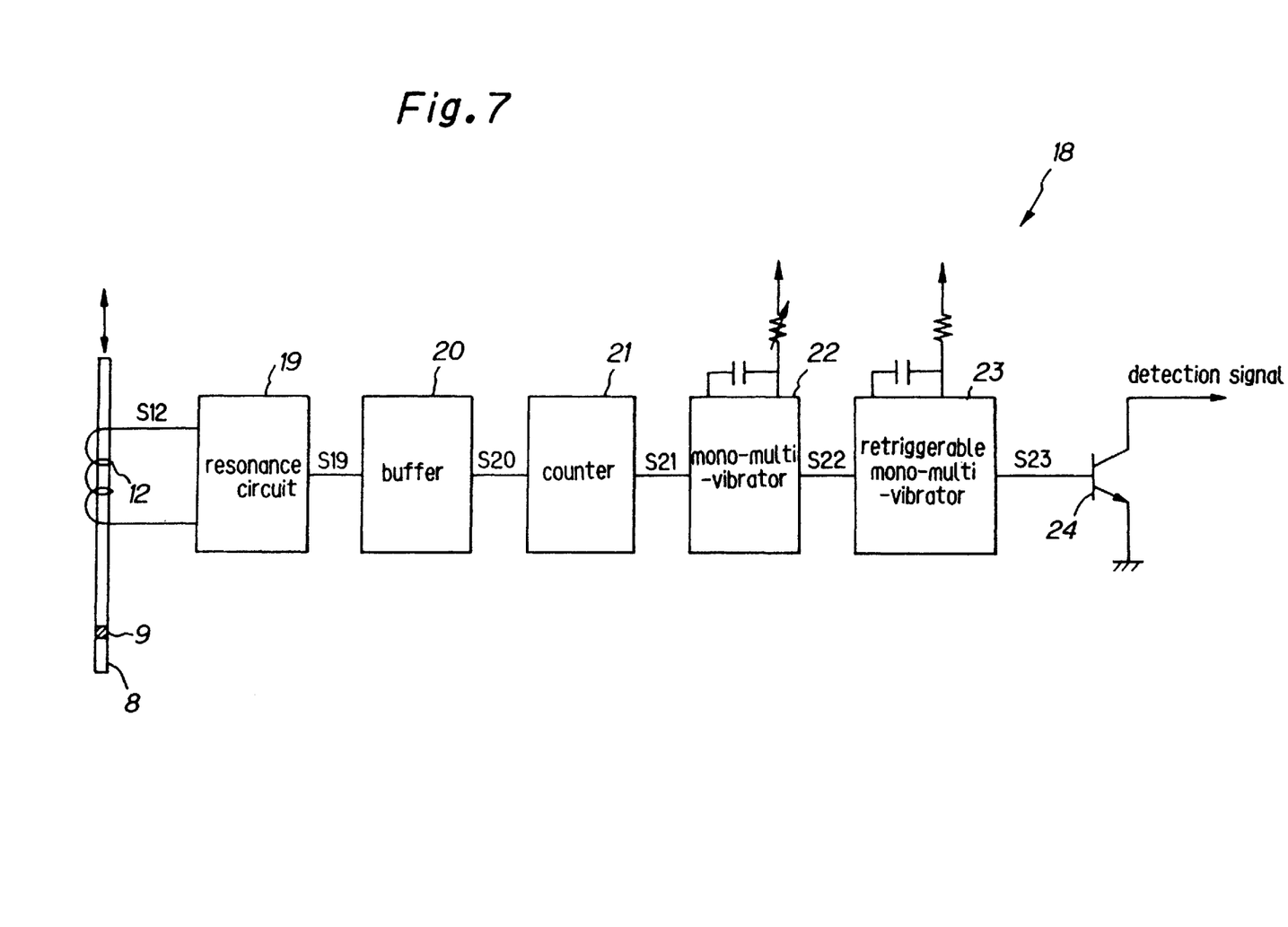
FIG. 7 is a block diagram showing a structure of the detection portion of the present invention.
Figure 8:
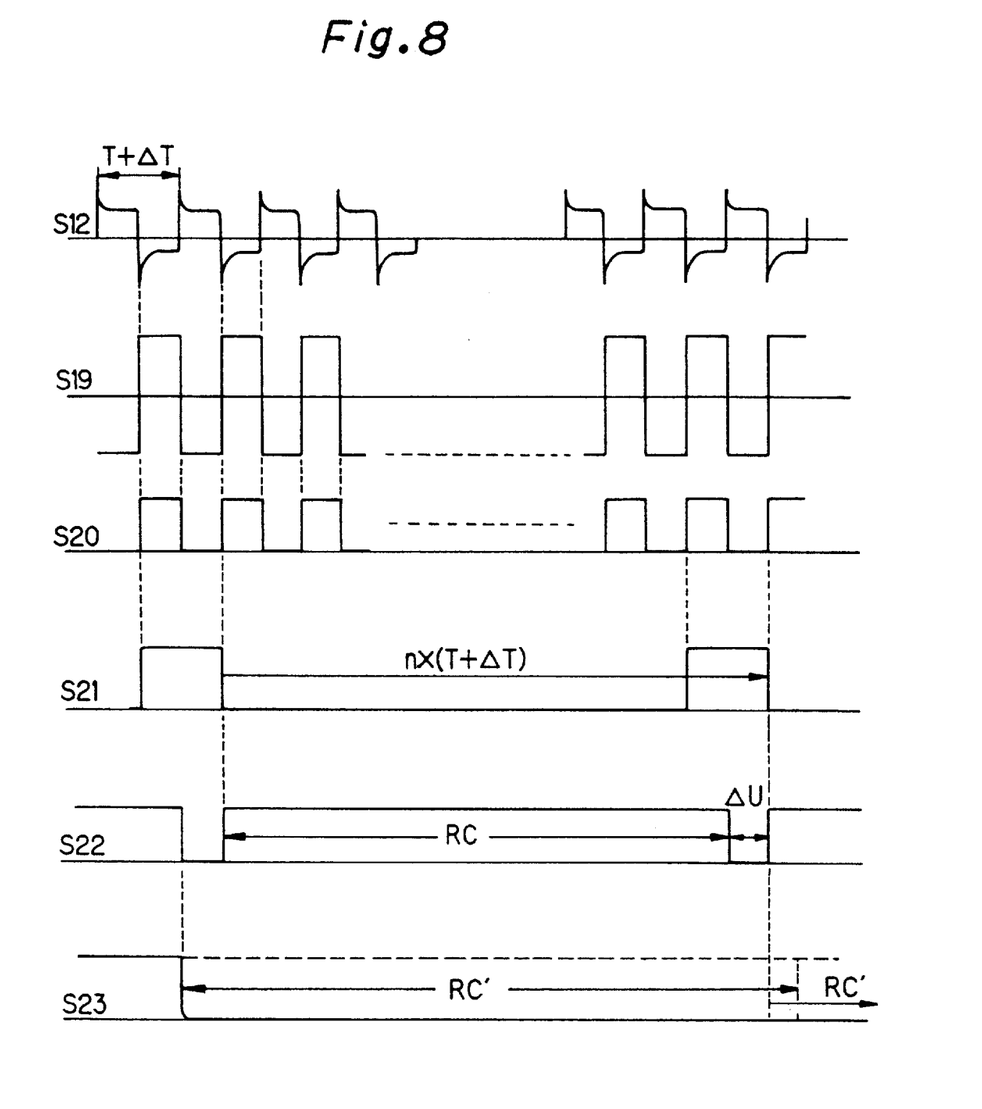
FIG. 8 is a time chart showing an operation of detection unit as shown in FIG. 7.

FIG. 7 shows a specific example of the detection circuit. FIG. 8 shows waveform diagrams of the corresponding part of FIG. 7.

Reference numeral 19 is a resonance circuit which uses the coil 12 as an inductance circuit. For example, a modified Wien-bridge oscillation circuit is used. An output signal S19 is reversed to the detection signal S12 of the coil 12 in relationship of the leading and trailing edges. In the drawings, reference "T" represents a period and "ΔT" represents a variation of the period in response to changing of the inductance.

The output signal S19 of the resonance circuit 19 is sent to a buffer 20 to be wave-shaped, and then sent to a counter 21 as a clock signal.

The counter divides the output signal 20 into 1/n (n≧2, n being integral number) so that detection accuracy of the inductance change is amplified to n times, (see period n×(T+ΔT)). Accordingly, the change of inductance is made easy to detect.

An output signal S21 of the counter 21 is subsequently sent to a mono-multi-vibrator 22 and a retriggerable mono-multi-vibrator 23 to measure a period of the signal.

The mono-multi-vibrator 22 is designed having an adjustable reference time constant by an external resistor and a capacitor so that an output pulse whose pulse width is in response to the inductance change is obtained in accordance with the signal width responsive to the reference time constant and the trailing timing of the output signal S21 of the counter 21. Accordingly, a threshold level for inductance is predetermined so that the reference time constant is determined to be zero pulse width if the inductance is lower than the predetermined threshold level. In FIG. 8, the width ΔU in the signal S22 is varied in response to the change of the inductance. For example, the threshold level is determined as an intermediate value between the inductance of the detection portion of the ball screw and that of the other portions.

The retriggerable mono-multi-vibrator 23 receives an output pulse from the mono-multi-vibrator 22 so that the reference time constant (see RC' in FIG. 8) is set by an external resistor and a capacitor in a manner that the vibrator 23 outputs "0" in case of the pulse width being zero while outputs "1" in case of the pulse width being not zero. (It should be noted that it is negative logic.) Then, the binarized signal is sent to an open-collector transistor 24 to obtain a detection signal.

As described above, according to the invention, the detection portion of the shaft has a permeability which is different from that of the other portions in the shaft and because of this difference the inductance change in response to whether the detection portion is located in the detection coil is able to be detected. Further, the detection portion may have a cross section area which is different from that of the other portions in the shaft made of magnetic material. As a result, the change of inductance may be detected in response to whether the detection portion is located in the detection coil. Accordingly, the detection accuracy is prevented from lowering due to disperse of the grease coated on the shaft.

Moreover, according to the invention, a magnetic tape may be wound on the shaft or a magnetic layer may be formed to define the detection portion. That is, it is possible to form a detection portion after the shaft has been produced.

Still further, according to the invention, it is selectable to detect the inductance change in proportion to the cross section area of the shaft or the inductance change due to an edge between the detection portion and the other portions, according to the energization frequency applied to the detection coil.

Still further, according to the invention, the alternating output of the oscillation signal is detected of the resonance portion which uses the detection coil as an inductance element. Then, the period of the alternative component is detected and is binarized so that the position of the detection portion is detected by relatively simple manner.

Still further, the invention is applied to the ball screw of which a cross section area is constant even if the lead groove is formed on the surface. Therefore, it is possible to decrease the unevenness of the detection accuracy.

What is claimed is:

1. A shaft position detection device for detecting a certain position on a shaft, comprising:

a movable shaft including a detection portion to be detected, a characteristic of which is a diameter smaller than the diameter of other portions of said movable shaft;

a position detection coil into which said movable shaft is freely inserted;

an inductance detecting means connected to the position detection coil for detecting a change in inductance between a case of said detection portion being in said position detection coil and a case of said detection portion being out of said position detection coil;

wherein a position of said detection portion is detected in response to said change in inductance; and further wherein said coil is energized at a frequency which is determined by the characteristics of said detection portion.

2. The shaft position detection device as claimed in claim 1, wherein said movable shaft is made of a magnetic material.

3. The shaft position detection device as claimed in claim 1, wherein said movable shaft is made of a magnetic material and a permeability of said detection portion is different from that of the other portions.

4. The shaft position detection device as claimed in claim 1, wherein said movable shaft is a ball screw.

5. The shaft position detection device as claimed in claim 2, wherein a low frequency is applied to said position detection coil as an energizing frequency, so that said inductance detecting means detects a change in inductance wherein said inductance is substantially in proportion to the cross section area of said movable shaft.

6. The shaft position detection device as claimed in claim 2, further comprising an edge formed on said movable shaft at a boundary between said detection portion and the other portions.

7. The shaft position detection device as claimed in claim 6, wherein a high frequency is applied to said position detection coil as an energizing frequency, so that said inductance detecting means detects a change in inductance due to said edge formed at the boundary between said detection portion and the other portions.

8. A shaft position detection device for detecting a certain position on a shaft, comprising:

a movable magnetic shaft including a detection portion to be detected, a characteristic of which is different from all other portions;

an edge formed by a change in the cross section area of said movable shaft at a boundary between said detection portion and the other portions;

a position detection coil into which said movable shaft is freely inserted;

an inductance detecting means connected to the position detection coil for detecting the change in inductance between a case of said detection portion being in said position detection coil and a case of said detection portion being out of said position detection coil;

wherein a position of said detection portion is detected in response to the changing of said inductance;

wherein a high frequency of 500K to 1 MHz is applied to said position detection coil as an energizing frequency, so that said inductance detecting means detects a change in inductance due to said edge.

9. The shaft position detection device as claimed in claim 8, wherein said detection portion is defined by winding a magnetic tape on said movable shaft at a certain position.

10. The shaft position detection device as claimed in claims 1 or 8, wherein said detection portion is located away from an end of said shaft.

11. The shaft position detection device as claimed in claims 1 or 8, wherein said movable shaft comprises a second detection portion, a characteristic of which is different from other portions of said movable shaft.

* * * * *